United States Patent [19]
Nomura

[11] 3,811,346
[45] May 21, 1974

[54] BOX-SHAPED GUIDE BUSHING AND DRIVING CONTROL UNIT FOR CUTTING TOOLS FOR HEAD STOCK MOVING TYPE SCREW MACHINES ENCASING CUTTING TOOL DRIVING SYSTEM

[76] Inventor: Takayuki Nomura, Tanazaua 437 Okutamamchi, Nishitamagun, Tokyo, Japan

[22] Filed: Dec. 17, 1971

[21] Appl. No.: 209,153

[30] Foreign Application Priority Data
Dec. 23, 1970   Japan.............................. 45-117990

[52] U.S. Cl............................. 82/25, 82/35, 29/37 A
[51] Int. Cl........................................... B23b 21/00
[58] Field of Search .................. 82/25, 35; 29/37 A

[56] References Cited
UNITED STATES PATENTS

| | | | |
|---|---|---|---|
| 2,374,112 | 4/1945 | Lloyd................................ | 82/2.5 X |
| 3,250,159 | 5/1966 | Bergonzo............................. | 82/25 |
| 2,585,216 | 2/1952 | Bickel et al........................... | 82/24 |
| 2,831,387 | 4/1958 | Ovshinsky............................ | 82/24 |

*Primary Examiner*—Leonidas Vlachos
*Attorney, Agent, or Firm*—Fidelman, Wolffe, Leitner & Hiney

[57] ABSTRACT

In a head stock moving type automatic screw machine, a guide bushing including a frame therefor made in a hollow box shape, cutting tool rests disposed radially on the frame with work centrally positioned, a power source for the driving cutting tool rests being directly mounted on the frame for the guide bushing and means to permit at least two cutting rests opposedly disposed with the work centrally positioned to be driven in common with utilization of normal and inverse revolution of the motor and at the same time providing that several other cutting tool rests be driven in common by the motor output into another system encased in the same box-shaped frame; the automatic screw machine including numerical control arrangements for driving of the cutting tool rests.

2 Claims, 11 Drawing Figures

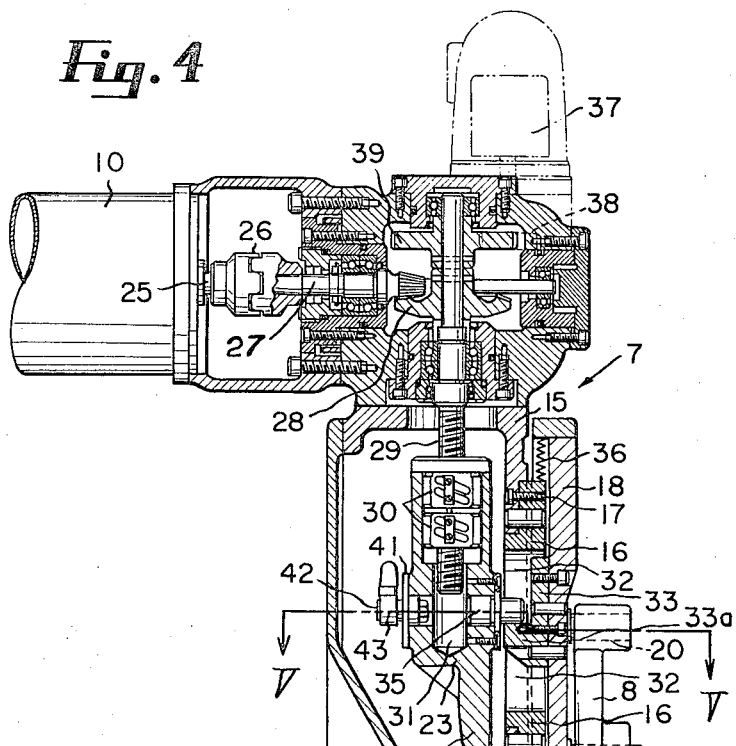
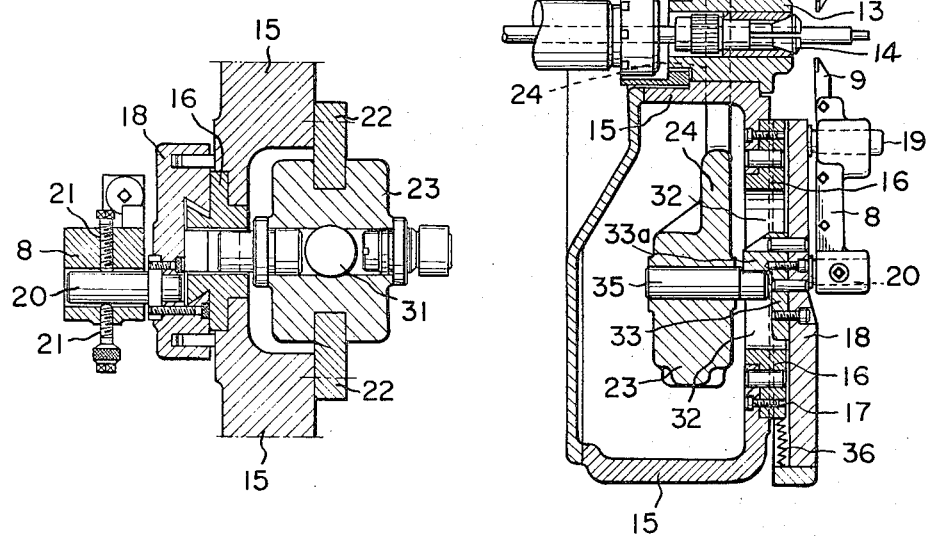
Fig. 4
Fig. 5

BOX-SHAPED GUIDE BUSHING AND DRIVING CONTROL UNIT FOR CUTTING TOOLS FOR HEAD STOCK MOVING TYPE SCREW MACHINES ENCASING CUTTING TOOL DRIVING SYSTEM

The present invention relates to improvements in a guide bushing clamping a work, and a frame for mounting a cutting tool, more particularly to a rigid box-shaped guide bushing, in which numerically controlled cutting tool driving mechanisms are all encased in the guide bushing including a servo-motor as a power source and a driving system which is formed in such a manner that at least two cutting tools are controlled by one servo-motor. The invention further relates to a driving control unit for cutting tools, by which unit several cutting tools mounted on the paid guide bushing are precisely fed and controlled by a simple control system without any error.

A head stock moving type automatic screw machine is equipped with four to six cutting tools on the guide bushing thereof and controls feeding of each cutting tool in sequence relative to the work to be rotated and held by the guide bushing and makes possible the linear feeding in the central portion of the guide bushing, so that the desired cutting operation is effected automatically and continuously. The diameter of the work is 20 mm at most having several meters in length in an axial direction, thus the head stock moving type screw machine has a characteristic for its effectiveness in cutting operation of small size products.

Feeding of cutting tools mounted on guide bushing hitherto used were made by a purely mechanical driving means by combination of cam and link mechanisms, thereby the mechanical controlled variable (strength and motion) was transmitted from outside of the guide bushing to the cutting tools so as to precede the automatic cutting operation. Levers and link members forming a controlled variable means between the cam follower and the cutting tool rests are naturally mounted on the guide bushing: an individual manual-operated fine adjustment means was provided on every driving system for each cutting tool rest in all directions: and all these elements amounting to 20 were disposed directly on the guide bushing or extremely close to the guide bushing, thus forming a complicated and abnormal design and mechanism.

A frame for a plate body, which was reinforced only by several pieces of ribs to secure its rigidity. That is, as in the cutting tool driving means described above, in case of a system for feeding cutting tools by transmitting mechanical controlled variable through cam and link means from outside of the guide bushing, it is most advantageous for a frame for the guide bushing to be a plate body. Because, the change of shape of the frame for the guide bushing merely for the purposes of strengthening its rigidity is forced to make sacrifices in any form for the construction of a cutting tool driving means, which is most important. Supposing that the rigidity of the frame for the guide bushing is to be strengthened, a strength and motion for controlling cutting tools are transmitted from outside of the guide bushing, therefore it is meaningless unless the rigidity and preciseness are made considerably greater over installing parts for the guide bushing, head, cam shaft and other entire driving elements.

Also, an opposed type cutting tool rest system or the like has hitherto been limited in various points relative to the movement, construction or mode of cutting tool rest as the cutting strength member being common in construction. For example, the opposed type cutting tool rest of a bench lathe is common in slide mechanism, and two cutting tool rests are communicated by use in common of the slide mechanism. Therefore, two cutting tool rests in cooperation move only in entirely same way. Also, in a rocking cutting tool rest mounted on the head stock moving type screw machine hitherto used, a fulcrum of rocking movement thereof is made in common, and therefore, if a position of fulcrum is determined relative to the work, the movement and position of a cutting tool is necessarily determined.

In view of solving various difficulties in respect of previous guide bushing and cutting tool driving mechanism as described above, the present invention contemplates numerical control of the cutting tool feeding.

There are several systems for numerical control of the cutting tool feeding. For example, a numerical control system for the head stock moving type automatic screw machine hitherto generally employed has such construction that a cam shaft is numerically controlled and the cutting tool is fed by means of cam and link mechanism through several rod levers. This system, however is not different from that of the previous purely mechanical control process as described above, and is extremely inconvenient to control operational preciseness along with much complicated driving mechanism remaining unchanged, which is not to serve for what we require.

As for the numerical control, there are now known two kinds, that is, an open system and a closed system. In either system, strengthening rigidity of driving system means to make the operational preciseness greater. In case of the opened system, an error in the driving mechanism appears in the operational preciseness as it is, and when the rigidity is low, an unstable factor of error is especially increased, which can not be amended by way of control. In case of the closed system, when the rigidity of driving mechanism is low, an unstable factor is created, which is different from the former. At any rate, in order to strengthen the effectively rigidity of the driving mechanism necessary for preciseness, one needs, first, to contemplate strengthening rigidity of constructional elements for each part of the driving means. At the same time, it should be taken into consideration that the distance of driving mechanism is to be made as short as possible. That is, the rigidity is made greater in inverse proportion to the distance of driving mechanism.

An object of the invention is to provide a guide bushing capable of numerial control of cutting tools by the method, in which strength is not introduced from outside of frame for the guide bushing.

Another object of the invention to provide a guide bushing capable of numerical control of cutting tools with high preciseness including a frame for the guide bushing made in box shape having a great rigidity, in which the driving mechanism is constructed in a simple manner with a short distance having a great rigidity is encased.

A further object of the invention is to provide a guide bushing, in which the driving mechanism by which the feeding of at least two cutting tools is numerically controlled with utilization of the revolution of the output shaft of one servo-motor in both normal and inverse directions, is encased.

Still another object of the invention is to provide a control system (control unit), in the driving means of cutting tools as described, for numerical control without making many errors, capable of conversion of coordinate axis relative to feeding of cutting tools.

According to the present invention, the guide bushing itself serves to be an independent power unit and an attachment for cutting operation and possesses interchangeability, and a cutting tool driving system is considerably different from that of system hitherto used. And, more than two cutting tools are driven and controlled by one servo-motor, reducing considerably the number of control shafts, and enabling the cutting tool feeding mechanism to be of simple construction.

Further, according to the present invention, each cutting tool rest is provided with each independent moving part, and an independent sliding part of the cutting tool receives, when in cutting operation, a cutting resistance loaded on cutting tool and cutting tool rest, that is, a rotary moment or a cutting-in strength and a strength acted on the vertical plane relative to the moving direction of cutting tool, easily securing a considerable preciseness. Therefore, it may well be required for a cooperative factor of the paired cutting tool rest to merely provide with the sufficient rigidity and compressive strength only in the moving direction of cutting tool.

Since the distance in driving mechanism of cutting tool according to the present invention is very short in comparison with one hitherto employed, the rigidity of the entire driving mechanism is strengthened, which is extremely advantageous for promotion of correctness of control and operational preciseness. And, numerous adjusting operations, which had been hithertofore carried out in the vicinity of the guide bushing, can be carried out within the numerical control system, therefore complicated adjusting mechanism can be omitted simplifying driving mechanism.

According to the present invention, strengthening of the rigidity of the frame for the guide bushing has nothing to do with rigidity, preciseness, or efficiency of other driving systems, but has a good influence on the controlling side, and therefore the frame for the guide bushing has a significant meaning in its box-shaped construction advantageous in sectional modulus, and further when a servo-motor is directly mounted on the guide bushing so as not to introduce the strength for driving cutting tools from outside, the driving system forms a stress distribution of closed loop only within the guide bushing, and the rigidity of frame for the guide bushing leads to the rigidity of driving system as it is, and sufficient advantages being expected by strengthening individually the rigidity of the guide bushing.

The present invention has such effects that the guide bushing being made in a box-shaped construction, the rigidity of the guide bushing makes greater to have a good influence on operational preciseness, and further all of the driving elements (parts especially required to be free from dusts and dirts such as reduction gear and ball screws) on the cutting tool rest can be encased in a box so that a harmful influence such as cutting powdery matter or cutting oil can be completely intercepted. Especially, in case of numerical control of cutting tools, limit switches or the like for detecting a return to original position or overrun, reading-out device and necessary wiring thereto, and lubricating pipe for sliding parts are all encased in the guide bushing to conveniently protect from an outside harmful influence, and promoting the guide bushing in its external design.

Finally, according to the invention, a mirror image is incorporated to form a numeral control system, while in the previous type, when an operational programming work and a tape punching work, which require an absolute correctness, are carried out, the programming and punching work are progressed by representing positions of cutting tool and feeding directions having the original point of coordinate axis set as a base by use of positive and negative marks, which is often liable to make errors in positive and negative marks and causes to occur unexpected faults during the operation. In the control system of the present invention, however, it has such effect that the movement of cutting tools in any direction coming close to the work is made to be a positive mark and the movement of retraction from the work being made to be a negative mark so as to make possible programming work, thus simplifying programming and punching works and protecting errors.

For a better understanding of other objects, various advantages and effects according to the present invention, reference may be had to the embodiments as described hereunder and the accompanying drawings, in which:

FIG. 4 is a sectional view taken on the line IV — IV of FIG. 3;

FIG. 5 is a sectional view taken on the line V — V of FIG. 4;

Figure 1:
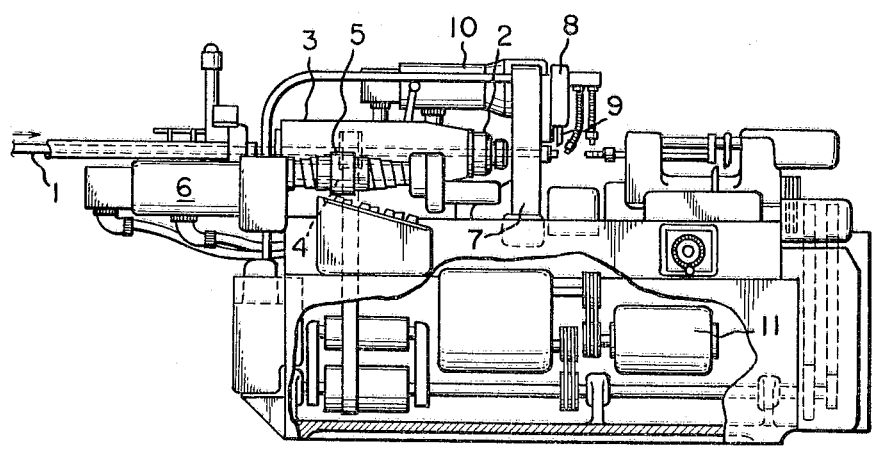
FIG. 1 is a front view of one embodiment of numerically controlled head stock moving type automatic screw machines.

The head stock moving type automatic screw machine with a numerical control completed has such a construction, as illustrated in FIG. 1, that a lengthy work 1 of several meters being passed through from the rear of the head stock 3 is clamped by chuck 2, the head stock 3 is cooperatively engaged by combination of a feed screw shaft 4 and a lead nut arranged in parallel on one side thereof, said feed screw shaft 4 being revolvably driven by the servo-motor 6 for driving the head stock so as to effect a fixed linear feeding of the work 1. The foremost end of the work 1 is projected ahead of the guide bushing 7 which is supported by means of a bushing for a stabilized rotation motion, and cutting tools necessary for treatment are mounted, ahead of the guide bushing 7, on several cutting tool rests 8 radially disposed with respect to the centrally positioned work 1, each cutting tool 9 . . . being fed in sequence by power of the servo-motor 10 directly mounted on the guide bushing 7 and performing its orderly cutting operation as fixed.

The work 1 is rotated at a most suitable speed by means of a main shaft driving motor 11. The head stock driving servo-motor 6, the cutting tool rest driving motor 10 and the main shaft driving motor 11 are each controlled by a punch tape inserted in the numerical control unit.

Figure 2:
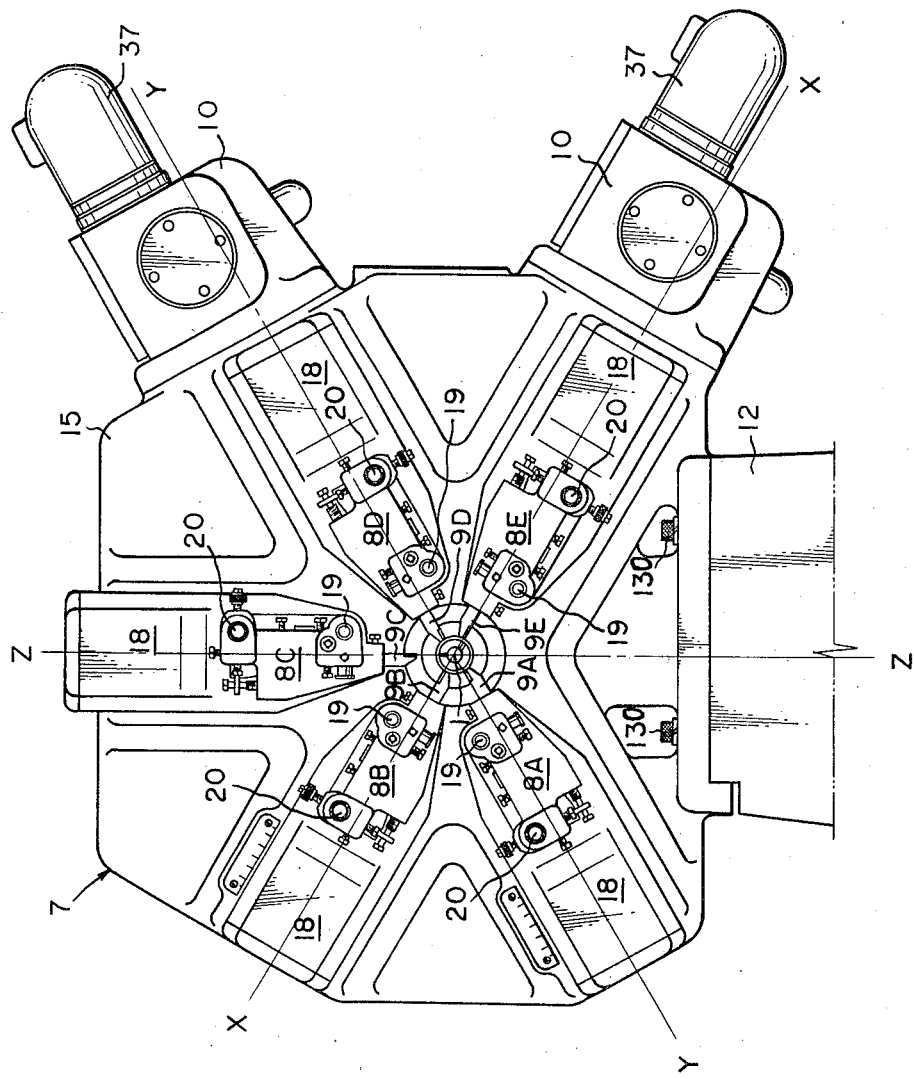
FIGS. 2 and 3 are a front view and a rear view with a style strip removed, respectively, illustrating a first embodiment of a guide bushing according to the present invention.
Figure 3:
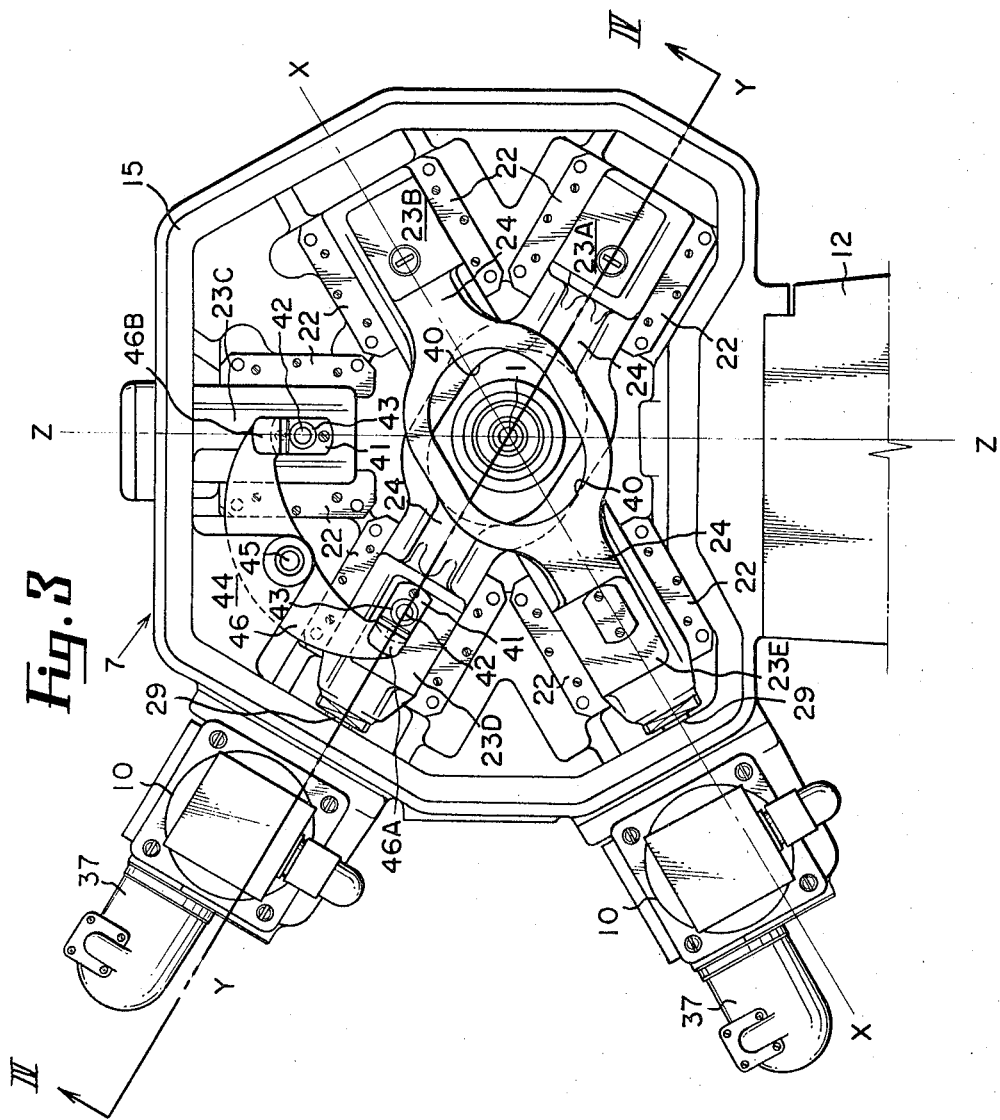

As shown in the first embodiment of FIGS. 2 and 3, the guide bushing 7 is firmly secured to a bed 12 by means of stud bolts 130.

In the central portion of the guide bushing 7, as shown in FIG. 4, a bushing 14 made of wear resistant alloy or cemented alloy is mounted within the bushing holder 13 in contact with the work 1 so that adjustment of aperture can be made to some extent according to the difference of diameters of the work 1.

A frame 15 for the guide bushing is constructed in the form of a hollow box, a front portion of which is in a vertical plane in which cutting tool rests 8 are radially disposed with respect to the centrally positioned work, that is, to the five cutting tool rests 8A – 8E, in the case shown in FIGS. 2 and 3, are mounted, and are attached cutting tools 9A – 9E necessary for all processes for cutting operations of material to be treated, such as roughing, side, siding finishing, cutting-off and threading.

The cutting tool rests 8 and the frame 15 for the guide bushing are correlatively disposed as illustrated in FIGS. 4 and 5, in which a bed 16 provided with an inverted-trapezoid guide on the surface of the frame 15 for the guide bushing is secured by means of a bolt 17, and a moving base 18 provided with a trapezoid channel, which corresponds to the guide for the bed 16, is arranged on the bed 16 so as to slide precisely. At the front and rear positions of the moving base 18 are mounted durable pins 19, 20 having a larger diameter, to which pins 19, 20 a cutting tool rest 8, which is provided with pin-holes having a high fit tolerance, is fitted and pin-locking locking is made by means of bolts 21, 21, to thereby make it possible to set the cutting tool 8 in a simple and precise manner.

Now, the driving mechanism for feeding these cutting tool rests 8 will be described. The foregoing five cutting tool rests 8A – 8E are driven by means of two servo-motors 10, 10, which servo-motors are directly secured to the frame 15 for the guide bushing. Due to the principle of operation that a pair of two cutting tool rests 8A and 8D, and 8B and 8E are fed in a linear movement by means of one servo-motor 10 revolved in a normal or inverse direction, the cutting tool rests 8A and 8D, and 8B and 8E in a paired relation are disposed on a straight line, which passes the center line of work 1, so as to put the work between them, thus the cutting tools in the paired relation are correlatively cooperated so as to be driven by the common servo-motor.

That is, at the back surface of the frame 15 for the guide bushing corresponding to positions, where cutting tool rests are installed, slide beams 22, 22 are secured at regular intervals in parallel to the moving directions of the cutting tool rests 8, and a slider 23 is mounted slidably in a highly precise manner to be positioned between slide beams 22, 22. Moreover, sliders 23A and 23D, and 23B and 23E relative to the cutting tool rests in a paired relation are constructed in a unitary manner and so made as to effect a unitary linear movement. The numeral 40 in FIG. 3 is a lengthy opening provided so that a connecting member 24 is away from the bushing and the work.

An output shaft 25 of the cutting tool driving servo-motor 10 is connected to a driving shaft 27 through the shaft coupling 26 and forms such a driving mechanism as to reach feed screw shaft 29 disposed in parallel to the moving direction of the cutting tools through the bevel gear train 28, and further forms such as driving mechanism that a feed screw shaft 29 is threaded in a lead nut 30 secured in the boring inlet of main sliders 23D and 23E, and the sliders are subject to high precise linear movement by means of both normal and inverse revolutions of the servo-motor 10. The numeral 31 is an opening provided in the slider 23 for receiving the feed screw shaft 29 thereinto. The screw pair between the feed screw shaft 29 and the lead nut 30 is made to be a ball screw mechanism which has a high precisenss but low resistance.

The relationship between the slider 23 and the cutting tool rest 8 is such that a window 32 in parallel to the moving direction of the cutting tool is provided in the bed 16 so as to sufficiently allow the moving stroke of the cutting tool, and a moving L-shaped block positioned within the window 32 is disposed and secured by bolt at the bottom surface of the cutting tool rest so that a head 33A is directed towards the cut-in direction of the cutting tool. There is provided such a mechanism that a durable feed pin 35 having a large diameter secured to the slider 23 is in contact behind the said head 33A, so that by drawing the moving base 18, the cutting tool 9 can be fed to the cutting tool rest 8 only in the cut-in direction with high preciseness, thereby a cutting tool rest 8 on non-cutting side is caused not to move during the time when the other cutting tool rest is in cutting operation. Each cutting tool rest 8 . . . retracts to a zero position by action of a compressive coil spring 36 mounted between the rear end of the moving base and the head.

A gear 39, which meshes with a pinion 38 mounted on the shaft of a resolver 37, is mounted on the feed screw shaft 29, so that the amount of feeding of the cutting tool 9 is detected according to the number of revolution and the angle of rotation of the feed screw shaft 29, feeding back to the phase discrimination circuit.

It would be possible to understand that with the construction as described above, a pair of cutting tool rests opposedly disposed with the work 1 centrally positioned, amounting to four in total, are fed and controlled by two servo-motors 10,10. As previously described, however, there are provided five cutting tool rests 8A – 8E on the guide bushing as shown in FIG. 2. A construction in which five or more cutting tool rests are fed by means of two servo-motors, will now be described.

In case the cutting tool rest 8C in the Z-axis direction should deviate from the group comprising a pair opposedly disposed with respect to the work 1, as shown in FIG. 2, one of the cutting tool rests adjoining thereto belonging to X-axis or Y-axis, which are positioned in either right or left side should be selected for use.

In FIG. 3, a cutting tool rest 8D in the Y-axis is selected, and in its slider 23D and the slider 23C, roller shafts 42 are firmly secured with the base plates 41 with utilization of pin openings provided for mounting feed pins 35, and freely rotatable rollers 42 are mounted on the roller shafts 42. With the utilization of a bracket 44 formed in one body on the frame 15 for the guide bushing, a crescent-shaped lever 46 is mounted rotatably and free to reciprocate at its center point round the pin 45, and heads 46A, 46B on the both ends are made in slight contact with said rollers 43, 43, and when the slider 23D is moved in the Y-axis direction by means of the servo-motor 10 and starts to retract further from the original position, such movement is transmitted by the lever 46 through the principle of leverage to the slider 23C in the Z-axis group, thus to feed the cutting tool in the Z-direction. Both the slider 23A on the other side making a pair in the X-axis group and the slider 23C in the Z direction are naturally subject to motion coming up to the work 1, however positions, where the cutting tools 9A and 9C thereof are each in contact with the work 1, being different, and therefore no trouble occurs at all by changing the kind of the cutting tools 9A and 9C or by providing a difference in the length of cut and the moving stroke. Also, by deviating the position of the pin 45, which clamps the lever 46, from the center, the length of motion (the length of variation) of the sliders 23C and 23D in a correlative relation can be increased or decreased at a regular rate. Therefore, by maximum application of the mechanism described above, four cutting tool rests can be controlled by one servo-motor.

Figure 6:
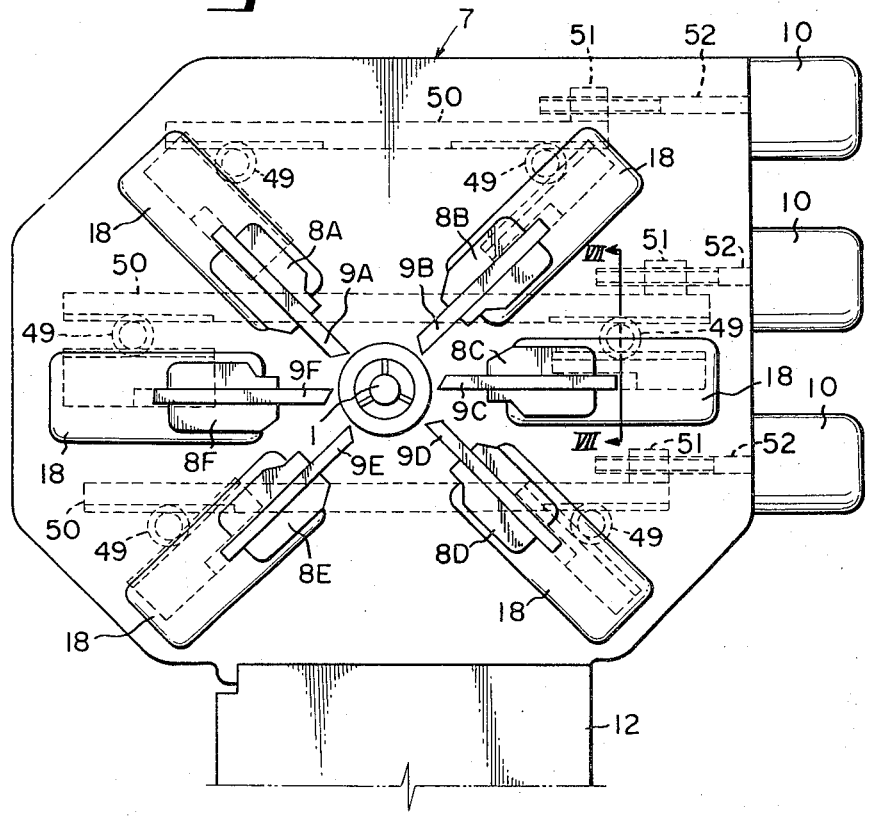
FIG. 6 is a sectional view of the second embodiment of the guide bushing according to the present invention.
Figure 7:
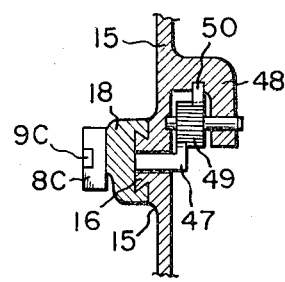
FIG. 7 is a sectional view taken on the line VII — VII of FIG. 6.

The second embodiment of the guide bushing will now be described referring to FIGS. 6 and 7.

The drawings show one example, in which six cutting tools 9A – 9F are radially disposed with respect to the centrally positioned work 1. Each cutting tool rest 8A – 8F is directed in the moving direction of the cutting tool, and on the inverse trapezoid shaped bed 16 mounted on the frame 15 for the guide bushing is mounted a moving base 18 slidable at a high preciseness, and the cutting tool rest 8 being sectured on the said moving base 18.

In case of this embodiment, the cutting tool rest 8 is driven with the utilization of a pinion-rack mechanism. That is, as is evident from both FIGS. 6 and 7, through the window provided in the bed 16 in the moving direction of the cutting tool, a rack member 47 secured to the bottom surface of the moving base is exposed to the back surface of the guide bushing, and a pinion meshed with the rack of racking member 47 is rotatably mounted on the inflated L-shaped member 48 at the back surface of the guide bushing, and the said pinion 49 is meshed with a rack bar 50 on the other driving side.

In order to make possible two kinds of feeding of cutting tools with utilization of two kinds of movements that is, advancing and retracting movements of one rack bar 50, two sets of cutting tool rests such as 8A and 8D, 8B and 8E, and 8C and 8F in a positioning relation as described are determined to be a group of one pair, and the rack bar 50 in common to pinions 49, 49 of each group is meshed therewith, and a lead nut 51 is mounted on each rack bar 50, and the output shaft of the servo-motor 10 directly secured to the frame 15 for the guide bushing is incorporated as a feed screw shaft 52 in a lead nut 51, thus forming a cutting tool feeding mechanism.

Figure 8:
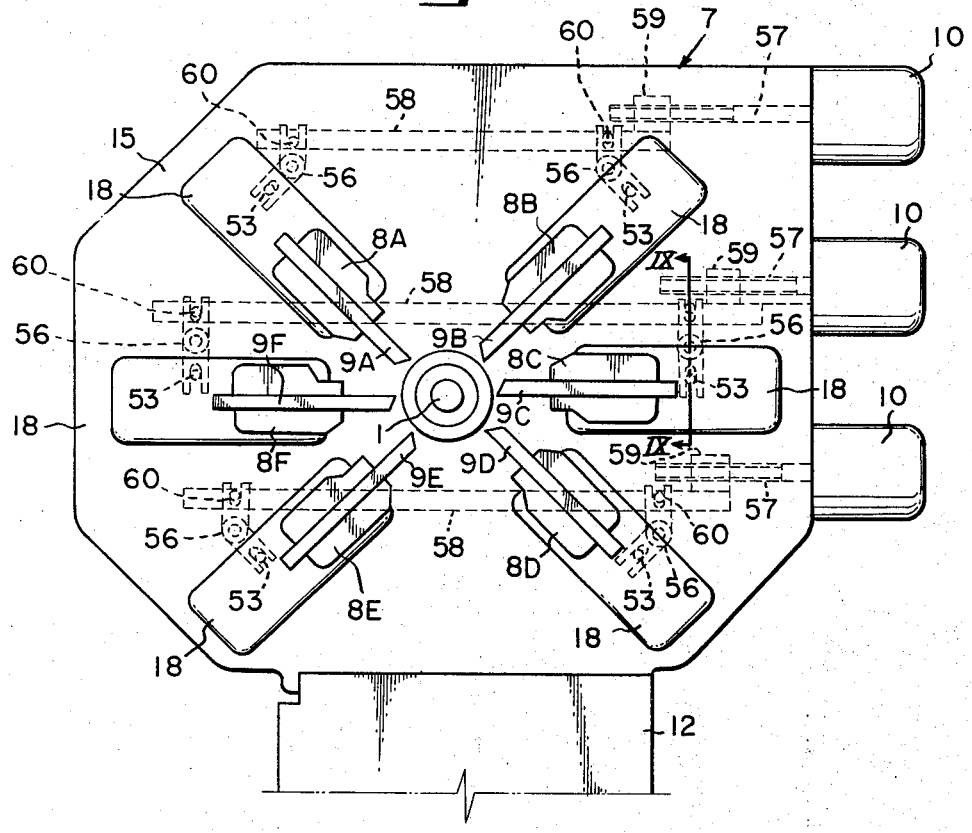
FIG. 8 is a front view of the third embodiment of the guide bushing according to the present invention.
Figure 9:
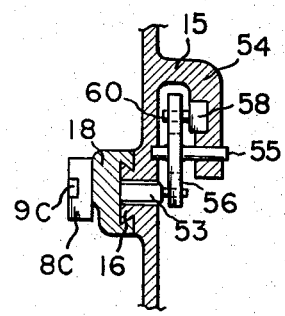
FIG. 9 is a sectional view taken on the line IX — IX of FIG. 8.

The third embodiment according to the present invention will now be described with reference to FIGS. 8 an 9. In the case of the present embodiment, six cutting tools 9A – 9F are disposed, and fed and controlled by three servo-motors 10 . . . .

This embodiment is different from the aforesaid two embodiments in that a pair of cutting tool rests are moved by application of the principle of leverage. The moving base 18 is slidably put on the inverse trapezoid shaped bed 16 mounted on the frame 15 for the guide bushing, and the cutting tool rest 8 is set on the said moving rest. In the bed portion 16 is provided a window in the direction of the cutting tool 9, and a head of pin 53 secured to the bottom surface of the moving base is projected out of the back surface of guide bushing through said window. A U-shaped channel, which is formed at one end of a lever 56 mounted free to reciprocate and rotate at a pin 55 with utilization of L-shaped bracket 54 mounted at the back surface of guide bushing, is fitted in the said head of pin 53.

On the other hand, the output shaft of each servo-motor 10 is formed to be a feed screw shaft 57 as it is and is incorporated in a lead nut 59 secured to a lengthy link member 58, and said lengthy link member 58 selects a group forming a pair of two common cutting tool rests 8A and 8B, 8C and 8F, and 8D and 8E in such a relation as to make it possible to feed the cutting tool to the work 1 with utilization of reciprocating motion of the link member 58. The link member 58 is bridged over between levers 56, 56 used for such cutting tool rests referred to as above, and pins 60, 60 mounted on the link member are fitted into U-shaped channels formed at the other end of each lever 56, so that two moving bases in the paired relation or cutting tools can be fed and controlled by means of one servo-motor 10.

Since a numerical control itself is generally known — how each cutting tool is numerically controlled in such a guide bushing as described above, only the characteristic of a control system developed by the present invention will now be mainly described, omitting unnecessary description.

Figure 10:
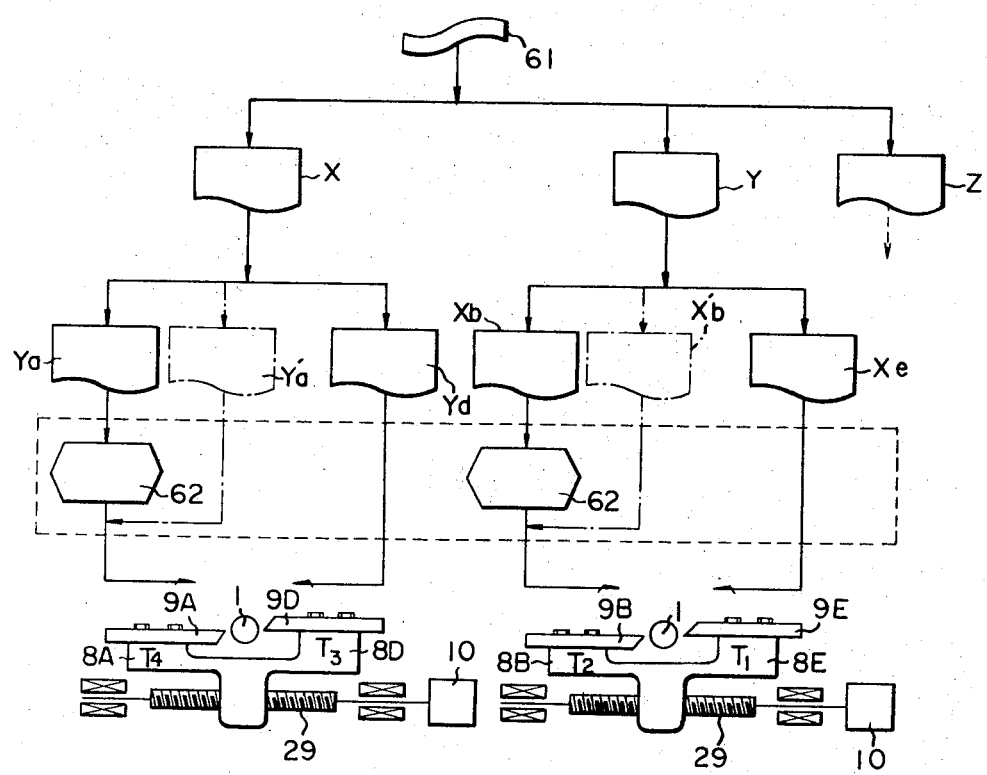
FIG. 10 is a flow sheet roughly illustrating a numerical control according to the present invention.

FIG. 10 represents systematically a numerical control according to the present invention an instruction given by a punching tape 61 is suitably imported to X-axis, Y-axis and Z-axis. For example, the controlled variable for the X-axis in FIG. 2 is given in consideration of variable, by which positions shown by 9B, 9E are controlled, for the Y-axis by 9A, 9D, and for the Z-axis by 9C, respectively. However, the cutting tool 9C on the Z-axis being in accordance with the feeding system by means of same servo-motor on the Y-axis system as that of 9A, 9D, is actually covered in the controlled variable for the Y-axis.

Since the controlled variable imported into X-axis and Y-axis effects, in the control system of each axis, cutting movement in an inverse direction relative to the work 1, there are discriminated into two kinds of controlled variable $Xa$, $Xd$ or $Yb$, $Ye$ in the positive and negative directions of each value on the coordinate axis.

Since the previous control unit has been so constructed as to control a position of cutting tool merely by such a system as described above, there is no way of discrimination, when the controlled variable $Xe$ on the X-axis system and the controlled variable $Yd$ on the Y-axis system are made positive mark, unless the controlled variables $Xb$, $Ya$ of cutting tools on the opposite side thereto are represented by negative mark. Therefore, it is extremely difficult to confirm such positive and negative marks, causing to occur errors; and the occurance of errors in such marks brings about the confusion of the entire control system, causing to manufacture worthless products, which should be avoided by all means. The previous system is shown by Y'a, X'b.

On the other hand, according to the present invention programming and punching are made possible with a pair of cutting tools 9A and 9D, and 9B and 9E made to be positive marks by arranging a mirror image 62 having a function of changing coordinate axes in the controlled variable treating system for X'b, Y'a naturally to be negative marks, thus eliminating previous disadvantages.

Figure 11:
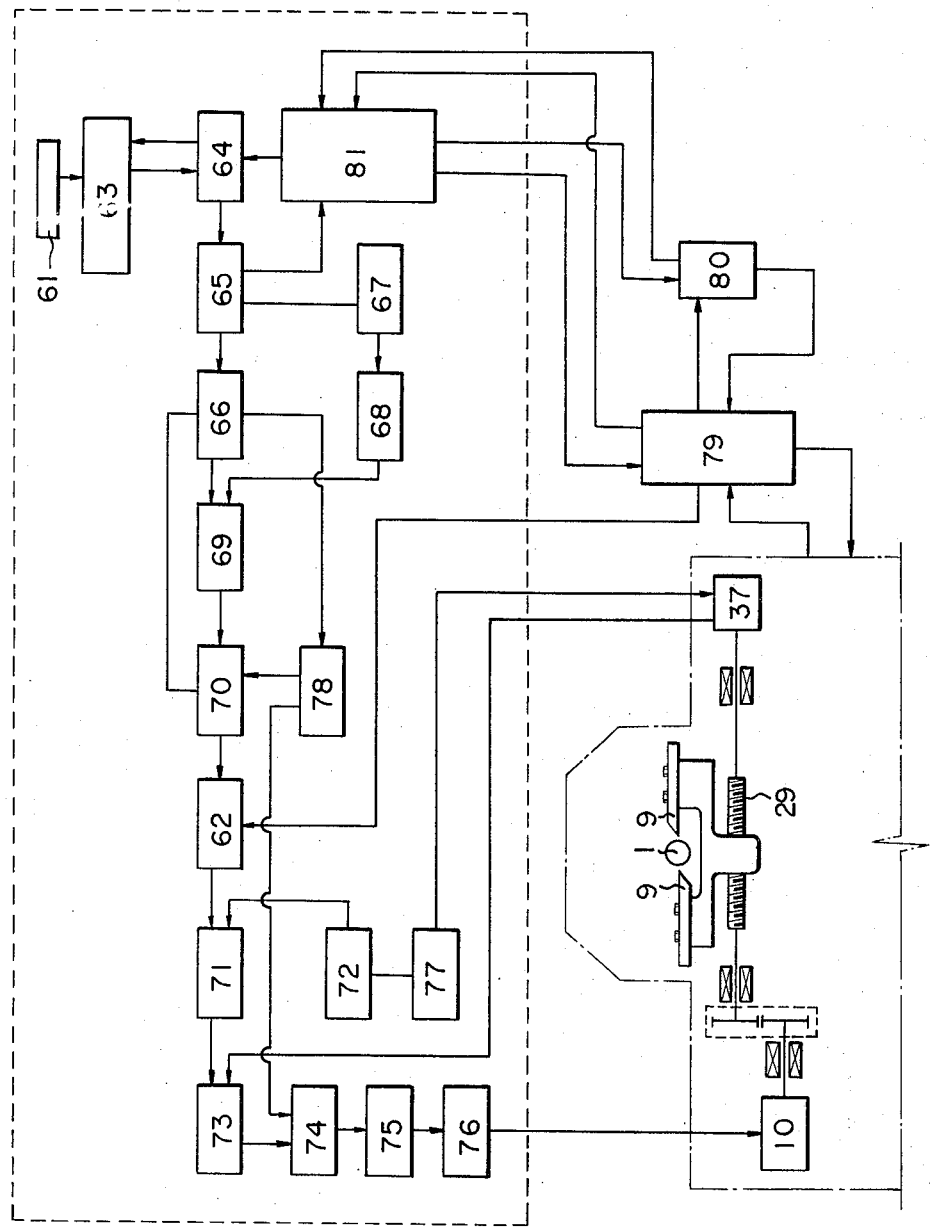
FIG. 11 is a block diagram of a numerical control unit according to the present invention.

A detailed construction of the control system so described as above is shown in FIG. 11. That is, in order to make possible to carry out a continuous operation in sequence of the work, a tape 61, in which a revolving speed of the work, order for selecting cutting tools, cutting-in and feeding speed of cutting tool, finish grade and other information necessary for operations are punched, is read out by a tape reader 63, the result of which is fed into an input control circuit 64, and the controlled variable is imported, through the buffer register 65, to each axis-position instructing register 66 which discriminates the kind and order of cutting tools, and a cutting tool feed-speed register 67.

Thus, after discriminating kind and order of cutting tools and speed thereof, the controlled variable for the cutting tool feed speed is converted into pulse signals through the pulse oscillator 68 and introduced into each axis pulse distributor 69, and these pulse signals are introduced into the gate circuit 70 to compose with pulse signal from the discriminating circuit 78 so as to form signal to be used according to kind of cutting tools finally used, or cutting tools selected out of either X or Y coordinate axis.

And, the conversion of coordinate axis is taken place, if so desired amongst controlled variables, through the mirror image 62, and resultant signal wave is introduced into each axis phase modulating circuit 71, where standard oscillator 72 is counted to form normal control signal, and said signal being discriminated by the phase discriminating circuit 73, and the controlled variable is fed to the servo-motor to be driven through analog gate 74, DC amplifier 75, and driving amplifier 76, thus the cutting tool 9 instructed is to be fed at a feed speed and cutting-in instructed so as to proceed cutting operation.

A signal is transmitted from the standard phase oscillator 77 to a resolver 37, which detects a position of cutting tool, and deviation from the detected value is fed back to the phase discriminating circuit. In FIG. 11, the numeral 78 is a discriminating circuit, 79 is a power control panel, 80 is an operating panel, and 81 is an auxiliary control panel for operating speed of main shaft, and replacement of tools.

What is claimed is:

1. A guide bushing and driving control assembly for cutting tools for head stock moving type automatic screw machines comprising:
   a. a hollow box-shaped frame for said guide bushing assembly;
   b. cutting tool rests mounted on said frame to slide radially with respect to a centrally positioned work;
   c. a motor, for use as a power source for driving said cutting tool rests, directly mounted on said frame; and
   d. means by which at least two cutting tool rests, which are opposedly disposed with respect to the centrally positioned work, are driven in common by utilizing the forward and reverse revolutions of one motor.

2. A guide bushing and driving control assembly for cutting tools for head stock moving type automatic screw machines comprising:
   a. a hollow box-shaped frame for said guide bushing assembly;
   b. cutting tool rests mounted on said frame to slide radially with respect to a centrally positioned work;
   c. a motor, for use as a power source for driving said cutting tool rests, directly mounted on said frame; and
   d. means coupling the motor output to more than two cutting tool rests to enable simultaneous cutting operations in more than one direction.

* * * * *

UNITED STATES PATENT OFFICE
CERTIFICATE OF CORRECTION

Patent No. 3,811,346                  Dated May 21, 1974

Inventor(s) Takayuki Nomura

It is certified that error appears in the above-identified patent and that said Letters Patent are hereby corrected as shown below:

Inventor: Takayuki Nomura
          Tanazawa 437
          Okutamamachi, Nishitamagun
          Tokyo, Japan Signed and sealed this 24th day of September 1974.

(SEAL)
Attest:

McCOY M. GIBSON JR.
Attesting Officer

C. MARSHALL DANN
Commissioner of Patents